US005270100A

United States Patent [19]

Giglio

[11] Patent Number: 5,270,100

[45] Date of Patent: Dec. 14, 1993

[54] PHOSPHORESCENT COLORING METHOD

[76] Inventor: Anthony J. Giglio, 52 Allwood Rd., Darien, Conn. 06820

[21] Appl. No.: 831,805

[22] Filed: Feb. 5, 1992

[51] Int. Cl.[5] .......................... B32B 3/00; B32B 27/14

[52] U.S. Cl. ....................................... 428/195; 40/542; 250/459.1; 250/462.1; 427/157

[58] Field of Search .......................... 427/157; 40/542; 428/195; 250/459.1, 462.1

[56] References Cited

U.S. PATENT DOCUMENTS

| | | | |
|---|---|---|---|
| 831,591 | 9/1906 | Aylsworth | 250/462.1 |
| 2,460,221 | 1/1949 | Gordon | 250/483.1 |
| 3,767,517 | 10/1973 | Williams | 427/157 X |
| 3,832,556 | 8/1974 | Schroeder | 250/462.1 |
| 4,035,652 | 7/1987 | Schroeder | 250/462.1 |
| 4,237,381 | 12/1980 | Schroeder | 250/462.1 |
| 4,745,286 | 5/1988 | Jones | 250/462.1 X |
| 5,073,843 | 12/1991 | Magee | 362/24 X |

*Primary Examiner*—Michael Lusignan

*Attorney, Agent, or Firm*—St. Onge Steward Johnston & Reens

[57] ABSTRACT

The present invention comprises an element and method for preparing phosphorescent colored indicia comprising providing a phosphorescent substrate; applying to said phosphorescent substrate a colored translucent media; exposing said colored phosphorescent substrate to excitation energy; and viewing said colored substrate and media in the dark.

14 Claims, 3 Drawing Sheets

PHOSPHORESCENT COLORING METHOD

DESCRIPTION

1. Technical Field

The present invention relates to a means by which crayons, translucent paints, and other semi-transparent media may take on the appearance of phosphorescence. In this way, drawings, paintings, or other writings prepared in normal light conditions can be observed in substantially their intended coloring in the dark, for amusement and education.

It has long been sought to create a phosphorescent or "glow-in-the-dark" crayon for use by children. Although greatly desired, the production of such a crayon has, to date, not been achieved. In addition, the production of phosphorescent fabrics, although also long sought, has yet to be attained.

What is needed, therefore, is a fluorescent element and method whereby drawings, paintings, colored writing and other markings or indicia can be viewed in the dark in glowing colors, in order to provide a new dimension and excitement to the enjoyment of the production of such drawings, paintings, and markings.

2. Background Art

Gordon, in U.S. Pat. No. 2,460,221, discloses the use of a phosphorescent backing sheet to enable the viewing of shapes in the dark. To do so, a light blocking figure in the shape of the desired form is placed on the sheet prior to exposure to light. After exposure, the sheet is placed in the dark and the light blocking figure removed, resulting in a "shadow picture" in the desired shape, which appears because the phosphorescence activating light was blocked by the figure. Of course, it will be recognized that this absence of phosphorescence cannot duplicate the desired glowing colors of the present invention.

Aylsworth, in U.S. Pat. No. 831,591, discloses superimposing opaque photographs or pictures on a phosphorescent background such that the image thereon is "conspicuously disclosed" because of the phosphorescent background. Moreover, Jones, in U.S. Pat. No. 4,745,286, and Schroder, in U.S. Pat. Nos. 3,832,556, 4,035,652, and 4,237,381, disclose the use of a phosphorescent background to permit writing in orderly form in the dark.

Unfortunately, nothing in the prior art permits preparation of drawings, paintings, color writing or other indicia which may be viewed, in color, in the dark. This is precisely what has been presented by the present invention.

DISCLOSURE OF INVENTION

The present invention comprises the use of a phosphorescent substrate to which is applied a translucent colored material so as to permit the user to observe the colors of the translucent material and the substrate in the dark. The phosphorescent substrate can be in any of various forms, including the form of individual sheets, small or large plastic articles, or small or large boards made of various materials.

DESCRIPTION OF THE DRAWINGS

The invention will be better understood and its advantages will become more apparent from the following detailed description, especially when read in light of the attached drawings wherein.

DETAILED DESCRIPTION OF THE PREFERRED EMBODIMENT

Figure 1:
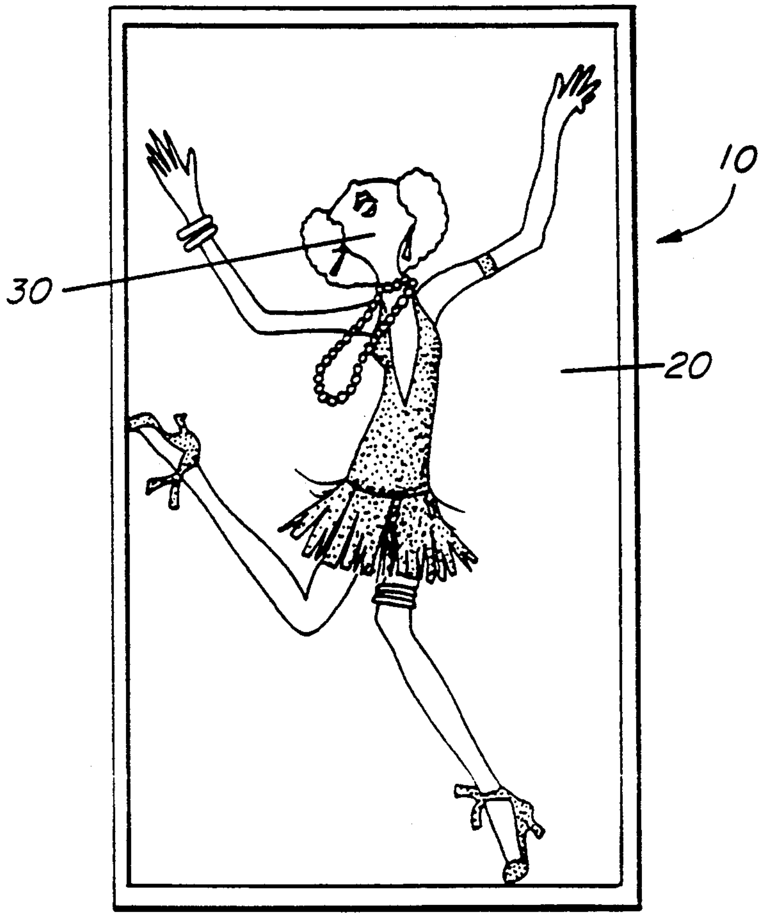
FIG. 1 is a front plan view of a drawing board of the present invention having a colored drawing thereon.

Referring to the drawings, a phosphorescent coloring system in accordance with the invention is generally indicated by the reference numeral 10. It should be noted that for the sake of clarity, all the components and parts of phosphorescent coloring system 10 are not shown and/or marked in all the drawings. In addition, the shapes of phosphorescent coloring system 10 of the drawings are exemplary only and not necessary for all embodiments of phosphorescent coloring system 10.

Phosphorescent coloring system 10 of the present invention comprises a phosphorescent base substrate 20 which, after exposure to a source of excitation energy, will remain visible in the dark for a period of time. Substrate 20 can comprise commercially available paper or cardboard which has been coated with a phosphorescent pigment dispersed in a relatively transparent coating agent. In addition, substrate 20 can comprise a plastic material, for instance, a polypropylene, high or low density polyethylene, polyamine, etc. In fact, virtually any coatable, plastic substrate may be used provided it has the dimensional stability to permit drawing thereon with crayon, inks, paints, or like media. In fact, substrate 20 can also comprise a metallic material such as aluminum or tin, rubber, wood, or composite materials provided a phosphorescent pigment can be coated thereon.

Moreover, substrate 20, when a suitable material, such as plastic, rubber, or a composite, can also be made phosphorescent by admixing the desired phosphorescent pigment in granular form with the material prior to formation of substrate 20, by such operations as injection molding, compression molding, extruding, etc., which will be familiar to the skilled artisan. The pigment is present in the material at a level of about 3% to about 60%, more preferably about 10% to about 25% by weight, to produce phosphorescence of desired intensity. In this way, entire substrate 20 will have a phosphorescent appearance, not just the area coated with phosphorescent material.

Phosphorescent materials are characterized by their ability to absorb and store excitation energy, in the form of natural or artificial light, which is then emitted in the form of visible light in the dark, but without the use of radioactive substances. Phosphorescent materials comprise phosphorescent pigments which are available in various colors including blue, green, yellow, orange, and red. The most common phosphorescent pigment is yellowish-green, which is brightest to the human eye, and has a wave length of about 530 nanometers (nm). This pigment is composed of a copper-doped zinc sulfide.

A phosphorescent pigment can remain visible in the dark for up to four hours and longer, depending on the source and intensity of excitation energy, the dark adaptation of the eyes, ambient light, and area of and distance from the phosphorescence, as well as other factors. A high ultraviolet (UV) source of energy is considered most effective as an excitation source, although virtually any light is effective at stimulating phosphorescence at some level.

In providing a phosphorescent pigment in a form in which it can be coated or onto a substrate, the pigments are dispersed in a binding medium which must be substantially transparent and, in fact, should be of a high transparency. The particular binding medium can be selected by the skilled artisan depending on the material to be coated or in which the phosphorescent material is to be blended.

Suitable binding media are neutral or alkaline and colorless. Moreover, the binding medium should be free of heavy metals, which have a negative effect on phosphorescence. The binding medium should have sufficient viscosity to maintain a pigment dispersion at a ratio of pigment to binder of about 1:3 to about 4:1 by weight. Exemplary of such materials are resins, varnishes, acrylics, paraffins, cellulose nitrate, and other materials.

In addition, it has been found that overcoating with a transparent varnish or a UV absorber may enhance the light stability and increase the life of a phosphorescent coating, although they may interfere with the ability to apply a colored media. Furthermore, a white base or primer coat on substrate 20 can enhance the brightness of a subsequently applied phosphorescent coating.

Substrate 20 can be formed in any desired shape in which the material which makes up substrate 20 can be formed, depending on the end use. For instance, substrate 20 can be formed as a standard 8½ inch by 11 inch sheet or board or, depending on desires and packaging needs, can be a small hand-held toy, or virtually any size. In fact, substrate 20 can comprise a wall mounted board on which drawings or other indicia can be applied and viewed in the dark.

Figure 2:
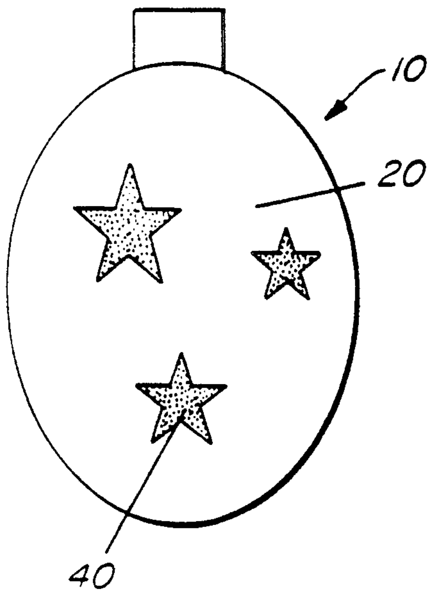
FIG. 2 is a front plan view of a Christmas ornament prepared according to the present invention.

As illustrated in FIG. 2, substrate 20 can also assume various shapes, including for instance, the shape of a Christmas ornament which can be colored and then hung on a Christmas tree by conventional means, a toy such as a gun, car, or truck or an article like a bicycle or a sled (or any part thereof). In fact, substrate 20 can assume virtually any desirable shape for application wherever desired by the user. For example, phosphorescent coloring system 10 can be used for jewelry items, novelties, etc.

The media used to apply the drawings or other indicia to substrate 20 can be any translucent media including colored wax or plastic crayons, colored inks or translucent paints. More particularly, standard coloring crayons, such as Dixon Brilliant brand crayons; inks provided in felt tip or highlighting pens, which are translucent, such "washable" Expo Dry Erase brand markers by Sanford Corporation, can be used; or paints which are at least partially translucent, can be utilized as the translucent media.

Translucence of the drawing media is important in order to permit phosphorescence from substrate 20 to reflect therethrough in order to permit viewing of the colors provided by the drawing media in the dark. If the drawing media was not translucent, the phosphorescence would not flow through it, which would provide shadow instead of coloring.

Depending on the nature of substrate 20, the phosphorescent coloring base of this invention may be reusable by either washing with warm water and soap or using a simple eraser such as tissue paper or an abrasive material eraser. This is especially applicable when substrate 20 comprises a plastic material in which phosphorescent material has been blended prior to formation. Use of an abrasive eraser should be avoided when the phosphorescent material is applied by coating in order to prevent damage to substrate 20 or removal of phosphorescent material.

In use, phosphorescent substrate 20 is provided and any desired drawing, painting, or pattern applied thereto as desired and as illustrated in FIG. 1 as drawing 30 and FIG. 2 as pattern 40. Drawing 30 or pattern 40 are applied using translucent media such as a translucent printing ink or paint or a translucent crayon.

Figure 3:
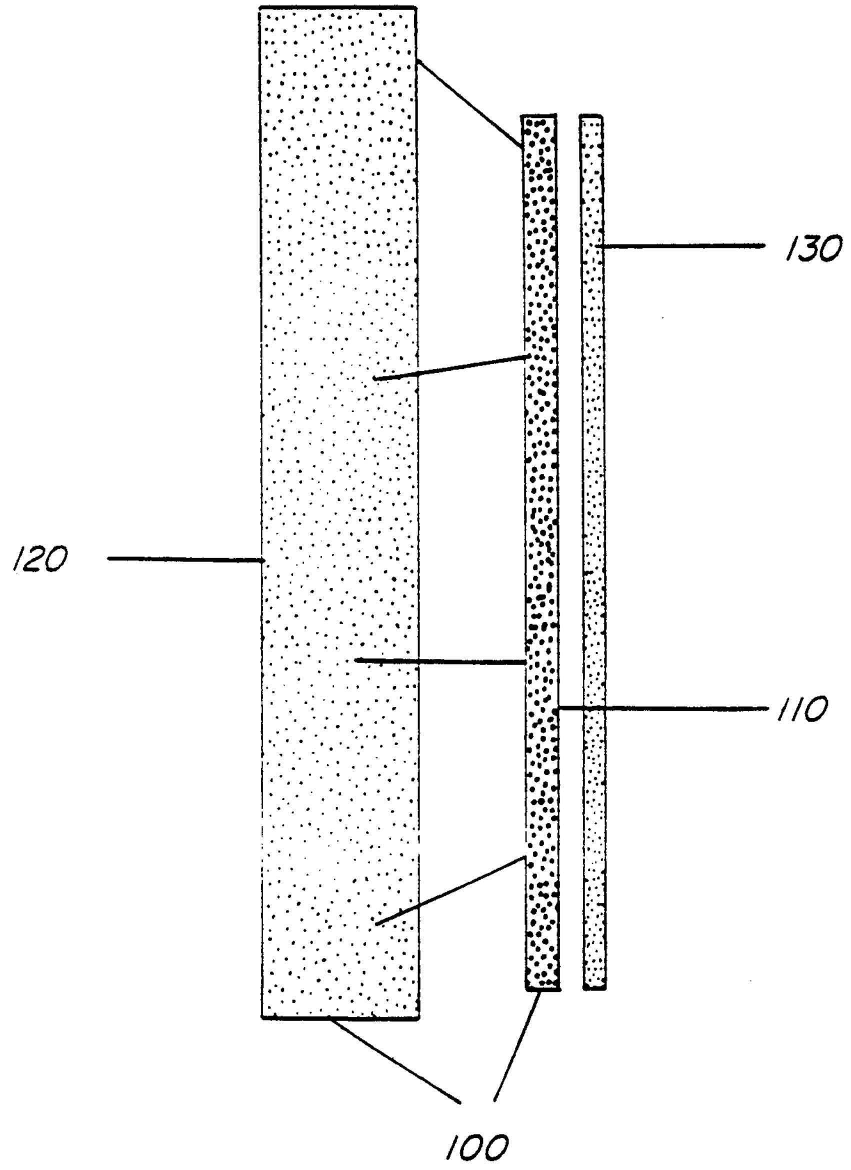
FIG. 3 is an exploded cross-sectional view of an alternate embodiment of the present invention comprising a flush fabricate.

In an alternate embodiment of this invention, illustrated in FIG. 3, a colored phosphorescent material can be applied by admixing the material with a translucent liquid binding material capable of bleeding through a backing material, such as a conventional fabric paint and applying the paint by any of various coating techniques to the underside of a porous material 100 such as a flush fabricate which can be used in the manufacturer of stuffed animals such as "teddy bears", throw pillows, rugs, wall hangings, slippers, or other materials. Such a flush fabricate, when used as porous material 100 comprises a backing 110 and a flush material 120, wherein a coating 130 of phosphorescent material is applied to backing 110.

When prepared in this manner, the phosphorescent material 130 causes the binding material to have phosphorescence, which then bleeds through backing 110 which causes backing 110 and some of flush material 120 to assume the color of phosphorescent coating 130. As a result, the flush material 120 will take on the phosphorescent color of backing 110. In this way, a phosphorescent material is prepared which can be used to form phosphorescent stuffed animals, rugs, throw pillows, etc.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

What is claimed is:

1. A method for preparing phosphorescent colored indicia comprising:
   a. providing a phosphorescent substrate;
   b. applying to said phosphorescent substrate a colored translucent media;
   c. exposing said colored phosphorescent substrate to excitation energy; and
   d. viewing said colored substrate and media in the dark.

2. The method of claim 1, wherein said substrate is selected from the group consisting of paper, cardboard, plastic, metal, rubber, wood, and composite materials.

3. The method of claim 2, wherein said phosphorescence is provided on said substrate by providing a coating of phosphorescent material on said substrate.

4. The method of claim 2, wherein phosphorescence is provided to said substrate by blending phosphorescent material into said substrate prior to formation of said substrate.

5. The method of claim 1, wherein said substrate is provided in an ornamental shape.

6. The method of claim 1, wherein said translucent media comprises a translucent crayon, printing ink, or paint, or mixtures thereof.

7. The method of claim 1, wherein said indicia comprises a drawing, painting, ornamental pattern or colored writing.

8. A colored phosphorescent material comprising a phosphorescent substrate having applied thereto a colored translucent media.

9. The material of claim 8, wherein said substrate is selected from the group consisting of paper, cardboard, plastic, metal, rubber, wood, and composite materials.

10. The material of claim 9, wherein said phosphorescence is provided on said substrate as a coating of phosphorescent material on said substrate.

11. The material of claim 9, wherein phosphorescence is provided to said substrate by blending phosphorescent material in said substrate prior to formation of said substrate.

12. The material of claim 8, wherein said substrate is provided in an ornamental shape.

13. The material of claim 8, wherein said translucent media comprises a translucent crayon, printing ink, or paint, or mixtures thereof.

14. The material of claim 8, wherein said media comprises a drawing, painting, ornamental pattern or colored writing.

* * * * *